United States Patent Office 2,986,435
Patented May 30, 1961

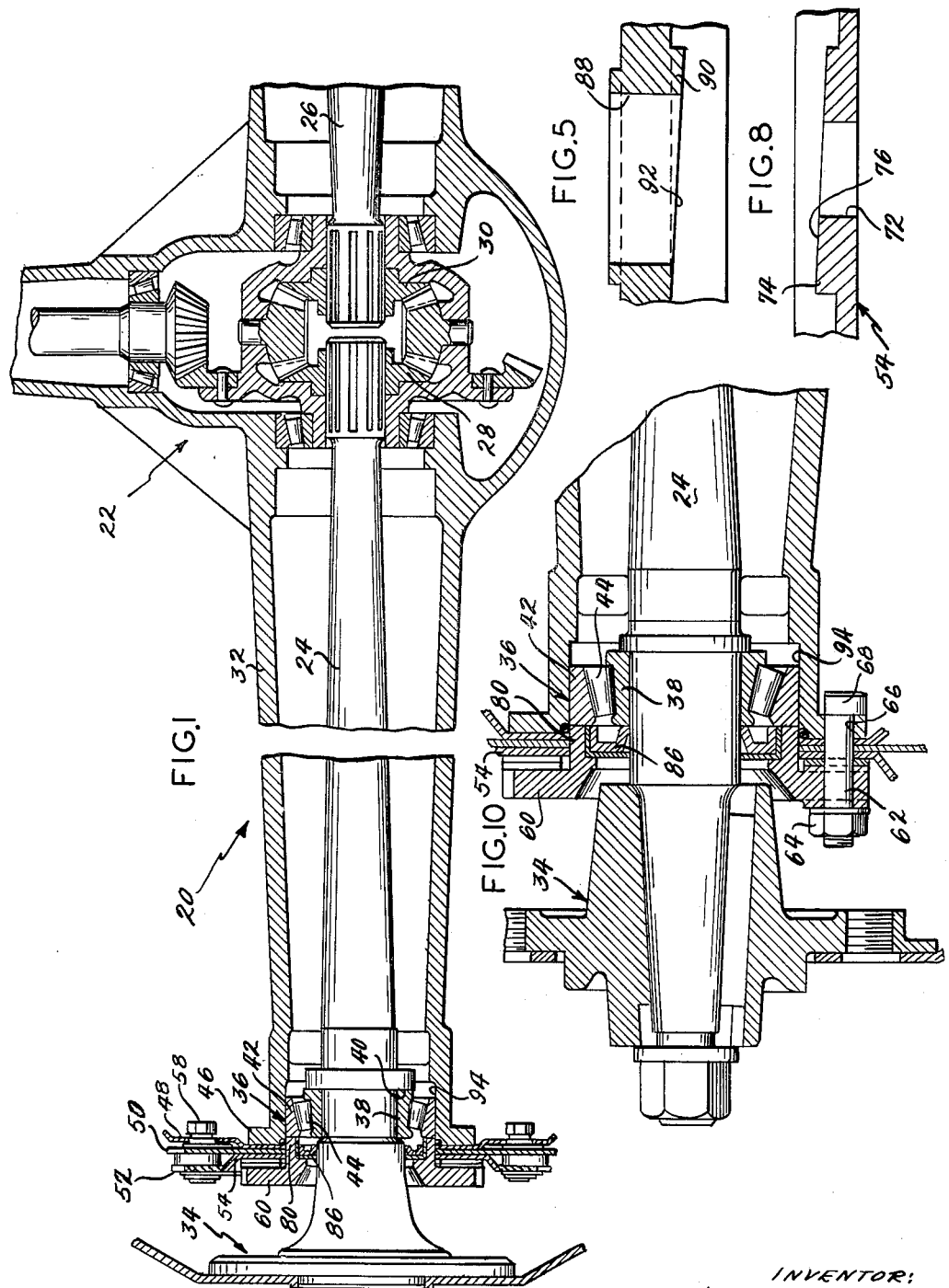

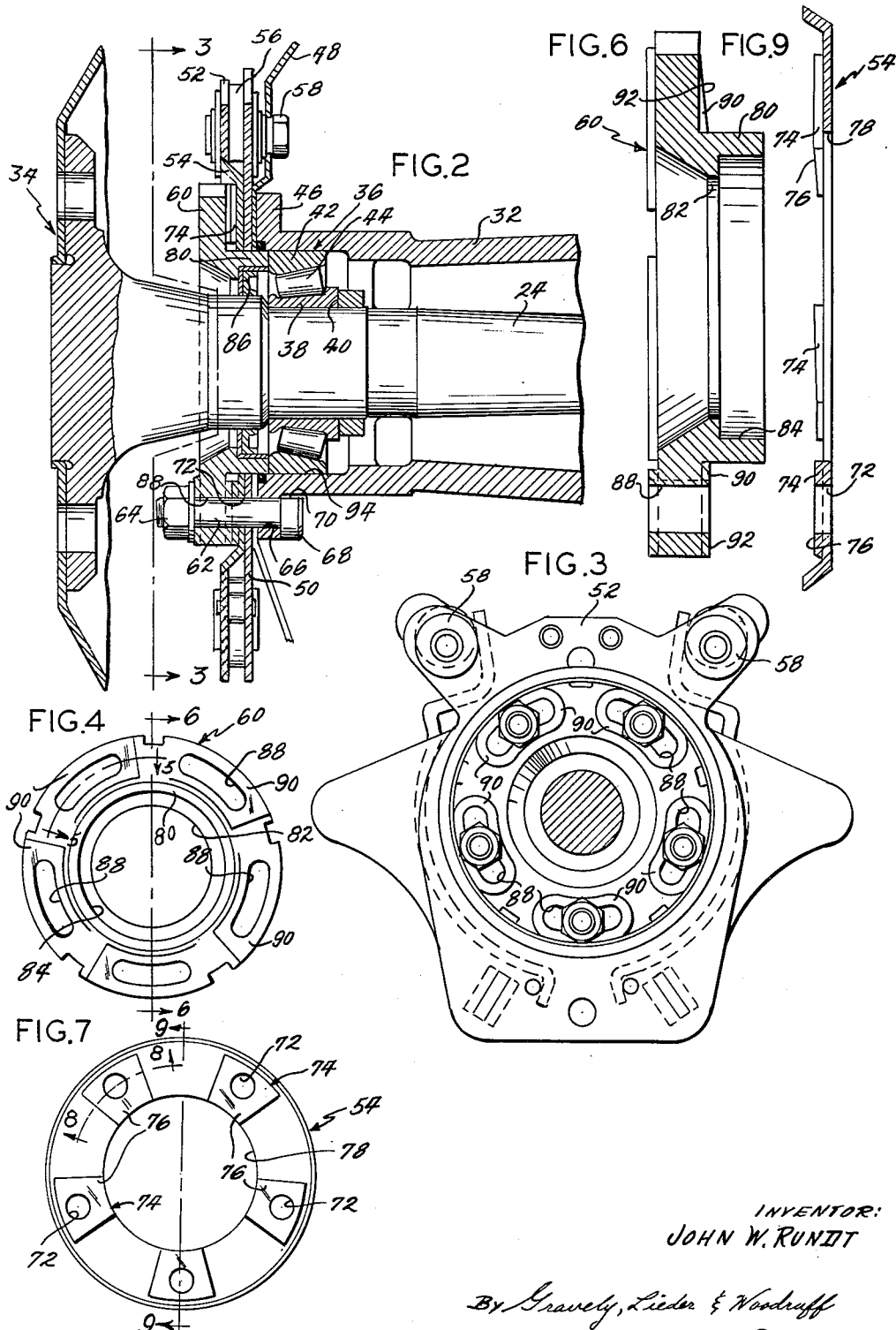

2,986,435
MEANS FOR LOADING BEARING MEMBERS OR THE LIKE

John W. Rundt, Canton, Ohio, assignor to The Timken Roller Bearing Company, Canton, Ohio, a corporation of Ohio Filed Oct. 6, 1958, Ser. No. 765,353
5 Claims. (Cl. 308—207)

The present invention relates generally to devices for loading bearing assemblies and more particularly to a device for axially loading tapered bearing members.

Various mechanical devices have been constructed in the past for loading bearing assemblies. The known devices have employed threaded means, yieldable means, and various other means. The known means, however, are not readily adjustable for varying the bearing load except by some technique such as shimming and are not flexible enough to permit quick and easy adjustment of the bearing load to compensate for wear and looseness. Furthermore, the known devices require maintaining a stock of adjustment shims or similar devices and for these and other reasons are disadvantageous to use.

The present invention overcomes these disadvantages of the known devices and teaches the construction of a device for adjusting the axial load on bearing assemblies or the like which have tapered inner and outer race members, one member of which is movable axially relative to the other member. The present device comprises cooperatively engaged and circumferentially tapered members, one member of which is retained in a fixed position relative to the bearing assembly, the other member being engageable with the axially movable race of the bearing and upon being angularly displaced relative to said fixed member changes the position of engagement of said tapered members and the axial position of said movable race, and locking means associated with said tapered members for retaining a position of adjustment thereof.

An object of the present invention is to provide means for adjusting the axial load on tapered bearing members.

Another object is to provide means built into a bearing assembly for adjusting the load on bearing members without requiring an inventory of parts.

Another object is to enable adjustment of the load on bearing members by ordinary hand tools.

Another object is to provide means adjustable to compensate for wear in bearing assemblies.

Another object is to provide means for adjusting the load on tapered bearing assemblies or the like which can be set at any adjustment position within the range thereof.

Another object is to provide means for adjusting the load on tapered bearing assemblies or the like which are relatively inexpensive to construct and which can be operated by relatively unskilled personnel.

These and other objects and advantages of the present device will become apparent after considering the following detailed description of a preferred embodiment in conjunction with the accompanying drawings.

In the drawings:

Fig. 1 is a fragmentary longitudinal sectional view taken through a differential axle assembly which includes a bearing load adjustment device constructed according to the teachings of this invention;

Fig. 2 is an enlarged fragmentary sectional view of the wheel and wheel bearing assembly of Fig. 1;

Fig. 3 is an enlarged cross-sectional view taken on line 3—3 of Fig. 2;

Fig. 4 is an enlarged view of the outer bearing load adjusting member 60 per se, as seen from the right in Fig. 2;

Fig. 5 is an enlarged fragmentary cross-sectional view taken on line 5—5 of Fig. 4;

Fig. 6 is an enlarged cross-sectional view taken on line 6—6 of Fig. 4;

Fig. 7 is an enlarged view of the inner bearing load adjusting member 54 per se, as seen from the left side thereof in Fig. 2;

Fig. 8 is an enlarged fragmentary cross-sectional view taken on line 8—8 of Fig. 7;

Fig. 9 is an enlarged cross-sectional view taken on line 9—9 of Fig. 7; and

Fig. 10 is a still further enlarged and fragmentary sectional view of the bearing load adjusting device showing an alternate style of axle and wheel hub construction.

Referring to the drawings in detail, number 20 in Fig. 1 refers generally to a differential axle assembly of a type employed on automotive vehicles. The assembly 20 includes a differential gear assembly 22 of known construction, axle sections 24 and 26 connected to gears 28 and 30 in the differential assembly 22 and extending therefrom in a housing 32, wheel assemblies such as assembly 34 mounted on the ends of the axle sections 24 and 26, and bearing assemblies such as bearing assembly 36.

Each of the bearing assemblies 36 has an inner tapered race 38 which is fixedly mounted on its respective axle section 24 (or 26) adjacent a shoulder 40 thereon, a tapered outer race 42 slidably positioned in the end of the housing 32, and a ring of anti-friction rollers 44 positioned therebetween.

An annular flange 46 is formed on the end of the housing 32 and means are mounted on the flange 46 for adjusting the axial position of the outer race 42 relative to the inner race 38. A dirt shield 48 is positioned adjacent to the flange 46, and members 50 and 52 are mounted adjacent to the member 48 and these latter members are connected by cooperating eccentric means 56 and 58. The eccentric means 56 and 58 are used for adjusting the travel of the brake shoes and are included to show an actual assembly but do not form part of the present invention.

An inner adjusting member 54 is positioned on the axle 24 adjacent the member 50 and cooperatively engages an outer adjusting member 60. The relative positioning of members 54 and 60 determines the bearing load, as will be shown hereinafter, and is important to the present invention.

The members 60, 54, 50 and 48 have openings therethrough as will be shown which are aligned with openings 66 in the flange 46 and the aligned openings receive bolts 62. The bolts 62 are secured in the openings by nuts 64. The openings 66 through the flange 46 are located closely adjacent to the outer surface of the housing 32, and the bolts 62 have heads 68 formed with flats 70 which engage the outer housing surface and prevent rotation thereof and aid tightening the nuts 64.

The details of the inner adjusting member 54 are shown in Figs. 7, 8 and 9. In Fig. 7 the member 54 is shown having five bolt openings or holes 72 which receive the bolts 62. The holes 72 are formed in the centers of elements 74 which are circumferentially tapered on surfaces 76 thereof. The member 54 also has a large central opening 78 which is slidably mounted on a sleeve 80 which is part of the outer adjusting member 60.

The outer adjusting member 60 is shown in detail in Figs. 4, 5 and 6 and consists of an annular portion with a large central opening 82 having a groove 84 formed therein (Fig. 6). The groove 84 receives an annular seal 86 (Figs. 1 and 2) that slidably and sealably engages the axle shaft 24. The member 60 also has five elongated openings 88 therethrough which receive the bolts 62. The bolt openings 88 are elongated on a circumference of the member 60 and are centered in tapered elements 90 having circumferentially tapered surfaces 92 thereon.

The members 54 and 60 are mounted on the flange 46 of the housing 32 with the tapered surfaces 76 and 92 of the elements 74 and 90 respectively in engagement. When so positioned the holes 88 and 72 are aligned with the corresponding holes 66 in the flange 46 and one of the bolts 62 is positioned extending through each set of aligned holes. However, because the holes 88 in the member 60 are elongated, the member 60 when the nuts 64 are loosened can be rotated through an angle corresponding to the length of the openings 88 to adjust the position of engagement of the cam surfaces 92 and 76. The surfaces 76 and 92 are tapered to cooperatively mate with each other and any change in the position of their engagement changes the overall axial dimension of the members 54 and 60.

The sleeve 80 on the member 60 is slidable axially in an end bore 94 of the housing 32 and abuts the end of the outer race 42. Therefore, any repositioning of the sleeve 80 in the bore 94 effects the load on the bearing assembly 36. Since the inner adjusting member 54 is fixedly positioned relative to the housing 32, rotation of the member 60 causes the sleeve 80 to change the load on the bearing assembly 36. If the sleeve 80 is moved to the right in Fig. 1 the outer race 42 will move to the right and increase the bearing load, and conversely if the sleeve 80 is moved leftwardly the bearing load will decrease. Once the proper bearing load is determined, the nuts 64 on the bolts 62 are tightened to hold the adjustment.

The spacer members 50 and 52 are shown to illustrate an actual bearing construction but are not directly involved in the novel concept of providing means to adjust the bearing load, and therefore, will not be described in detail.

Obviously, the embodiment of the device shown and described herein could be used to position the inner race instead of the outer race, and could also be used for positioning many other types of relatively movable members as well without departing from the spirit and scope of the invention.

Thus it is apparent that there has been shown and described a novel device for adjusting the load on bearing members or the like. Obviously, many changes, alterations, modifications and adaptations of the present device could be made which would not depart from the novel concept disclosed herein. All such changes, alterations, modifications and adaptations of the device which will readily be apparent to those having skill in the art are contemplated as being covered by this invention which is limited only by the claims which follow.

What is claimed is:

1. Means for loading a bearing assembly comprising a housing having an outer race slidably positioned therein, said outer race having an end face thereon, a rotary member with an inner race fixedly attached thereto positioned in said housing, a plurality of anti-friction members positioned between the inner and the outer races, at least two circumferentially tapered and axially facing surfaces on the housing, an adjustment member positioned adjacent to the housing and having a like number of circumferentially tapered and axially facing surfaces abuttingly engaged with associated ones of said surfaces on the housing, said adjustment member also having an axially facing surface engaged with the end face of the outer race, said adjustment member being angularly movable relative to said housing to change the positional engagement of said abutting circumferentially tapered surfaces and also the position of the outer race in the housing, and threaded means disposed about said housing and engaged with said adjustment member for securing said adjustment member to the housing in a preselected position.

2. The means for loading a bearing assembly defined in claim 1 wherein said threaded means includes an endwardly extending male threaded member attached to said housing, an elongated opening in said adjustment member receiving said male member to permit relative movement therebetween, and a female threaded member threadedly engaged with the male member to secure said adjustment member to the housing.

3. Means for adjusting the load on a bearing assembly comprising an axially immovable bearing member and an axially movable bearing member, said bearing members having spaced opposed bearing surfaces, and a plurality of anti-friction bearing members positioned therebetween, a first member slidably positioning the movable bearing member, a second member positioning the immovable bearing member, said first member having at least two angularly positioned axially facing and circumferentially tapering surfaces thereon, an adjustment member positioned adjacent to the tapering surfaces of the first member and in contact with the movable bearing member, said adjustment member having a like number of circumferentially tapering surfaces positioned in abutting engagement with corresponding ones of said surfaces on the first member, at least two circumferentially spaced male threaded members attached to said first member and a like number of elongated openings in the adjustment member each slidably receiving one of said male members therethrough, and a cooperating female threaded member threadedly cooperating with each of said male threaded members for securing the adjustment member to the first member, said female threaded members being capable of being loosened on said male members to permit angular movement of the adjustment member relative to said first member to change the loading on the bearing members.

4. Means for pre-loading a bearing assembly mounted on a shaft in the bore of a housing comprising a housing having a shaft rotatably mounted therein, relatively rotatable inner and outer bearing races positioned in said housing, said outer race being slidably positioned in the housing and said inner race being fixedly positioned on said shaft, a plurality of anti-friction rollers interposed between said races to form a bearing unit therewith, preloader means to urge and retain said races in loaded engagement with said rollers, said means including first and second cooperatively engaged and relatively movable members each having at least two angularly related circumferentially tapering surfaces thereon, said surfaces on said first member cooperatively abutting the surfaces on said second member, said first member being connected to the outer race and said second member being connected to said housing, and means connecting said first and said second members together to retain the abutting surfaces in a position of adjustment loading the bearing unit, said connecting means including cooperatively engaged male and female threaded members, and means on said first member adapted to be engaged by said connecting means in different preselected positions thereof.

5. Means for loading a bearing assembly mounted on a shaft in a housing comprising a bearing housing and a bearing shaft extending therein, an inner race fixedly mounted on the shaft, an outer race slidably mounted in the housing, anti-friction members positioned between said races, and adjustment means mounted on said housing for positioning the outer race relative to the inner race to load the bearing assembly, said adjustment means including at least two angularly related axially facing and circumferentially tapering surfaces on said housing, and an adjustment member having a like number of angularly related axially facing and circumferentially tapering surfaces adapted to be positioned in abutment with associated ones of the surfaces on the housing, said adjustment member being angularly movable relative to the housing for changing the positional engagement of said abutting surfaces, said adjustment member also having a surface in abutment with the outer race, and threaded means connected between the adjustment member and said housing securing said adjustment member thereto and positioning the outer race in a selected load position in the housing relative to the inner race according to the positional abutment of said abutting surfaces, said threaded means being loosened for changing the positional engagement of said abutting surfaces to thereby readjust the bearing load.

References Cited in the file of this patent

UNITED STATES PATENTS

| | | |
|---|---|---|
| 1,210,516 | Morris | Jan. 2, 1917 |
| 1,798,499 | Rock | Mar. 31, 1931 |
| 2,702,868 | Kindig | Feb. 22, 1955 |
| 2,916,336 | Andreini | Dec. 8, 1959 |